A. D. BARKER.
BAG HOLDER FOR COFFEE STRAINERS.
APPLICATION FILED DEC. 9, 1918.

1,307,475. Patented June 24, 1919.

INVENTOR
A. D. Barker.
BY
ATTORNEYS

UNITED STATES PATENT OFFICE.

ARTHUR D. BARKER, OF YAKIMA, WASHINGTON.

BAG-HOLDER FOR COFFEE-STRAINERS.

1,307,475.　　　　Specification of Letters Patent.　　Patented June 24, 1919.

Application filed December 9, 1918. Serial No. 265,978.

*To all whom it may concern:*

Be it known that I, ARTHUR DARWIN BARKER, a citizen of the United States, and a resident of Yakima, in the county of Yakima and State of Washington, have invented certain new and useful Improvements in Bag-Holders for Coffee-Strainers, of which the following is a specification.

My invention is an improvement in coffee strainers, and has for its object to provide a device of the character specified by means of which a coffee holding bag may be supported within an ordinary pot, leaving the hands of the operator free for the coffee making, in order to permit the making of drip coffee with an ordinary coffee pot.

Figure 1:
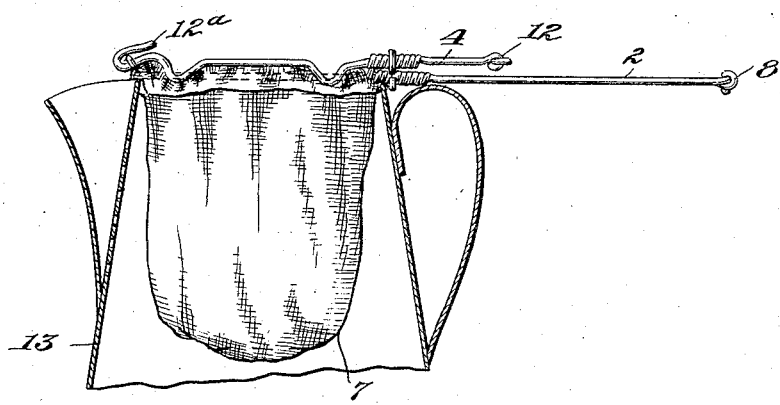
Figure 1 is a side view of the improved strainer, with the coffee pot in section.

In the present embodiment of the invention, the holder comprises a lower section consisting of a ring 1 having a handle 2, and an upper section consisting of a ring 3 and a handle 4. The upper section is hinged to the lower section, as indicated at 5, at the opposite side from the handles 2 and 4, and means is provided, indicated at 6, for clamping the two rings together on the edge of the bag 7 which holds the coffee.

In the present invention, the improved holder is formed from wire of suitable gage bent to shape, each section being formed from a single piece of wire. The section 1—2 is formed by bending the wire into the ring 1 and afterward bending the ends of the wire in parallel spaced relation to form the handle 2, the said ends being connected at their free ends by eyes 8. Between the ring and the handle the wires are twisted upon each other, as indicated at 9, to form a shank, and at that side of the ring remote from the handle the wire is bent to form a hinge bar 10 lying in spaced relation with respect to the ring.

The section 3—4 is formed from a single piece of wire, which is bent into an irregular circle, the ends being then twisted upon themselves, as indicated at 11, to form a shank similar to the shank 9, and the extremities of the wire are then bent into the handle 4 which is of ring form, the ends being connected by eyes 12. At that side of the ring 3 remote from the handle a hook 12ª is formed from the material of the wire, the said hook engaging the hinge bar 10 to hingedly connect the sections of the holder. The clamp is merely a hook of wire having a ring encircling the shank 10, the hook being adapted to engage the shank 9, to clamp the parts together upon the hemmed edge or top of the coffee bag 7.

Figure 2:
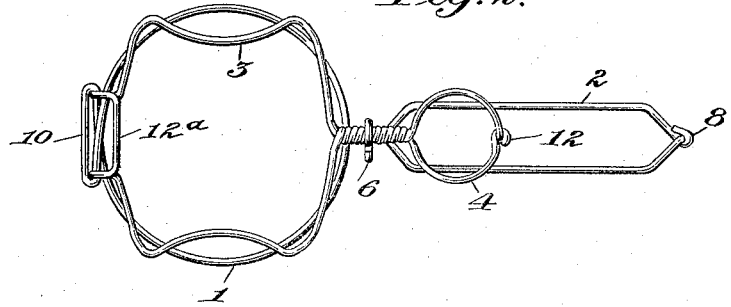
Fig. 2 is a top plan view of the frame.
Figure 3:
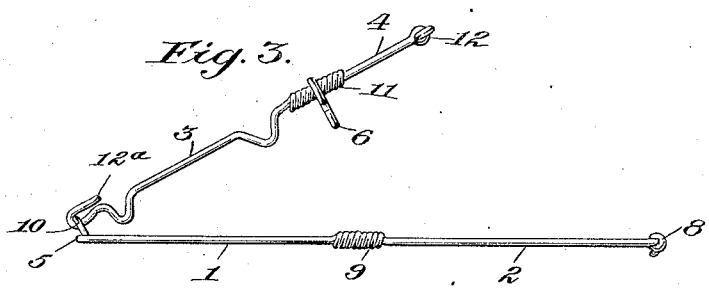
Fig. 3 is a side view with the frame open.

Referring to Fig. 2, it will be noticed that the portion 3 of the upper section, which is, roughly, of ring form, has bends which are bent downwardly with respect to the plane of the ring 4, and it is only these bends which engage the ring 1, four bends being provided in the present instance. As is known, drip coffee is made by percolating hot water through the ground or pulverized coffee, the said ground or pulverized coffee being held in a coffee bag in the urn. With the present invention, drip coffee may be made with an ordinary coffee pot, indicated at 13. The top of the pot is removed, and the bag, being placed in the holder as shown in Fig. 1, with the coffee therein, is lowered into the top of the pot, as shown. Now the hot water is poured over the coffee in the bag. The ring 1 may rest upon the top of the coffee pot if desired, or the holder may be held in the hand, where it is not possible or desirable to rest it on the top of the pot.

A clamp for clamping the bag is provided for convenience, the device in its simplest form being a ring for the bag, with a handle for convenience in handling the ring.

I claim:

A device of the character specified comprising a ring having a handle, a second ring having radial projections adapted to lap upon the first named ring, said second ring being hinged to the first named ring to swing toward and from the same and having a handle registering with the first named handle.

ARTHUR D. BARKER.